United States Patent

Storyk

[15] 3,675,884

[45] July 11, 1972

[54] SUSPENSION SYSTEM

[72] Inventor: John M. Storyk, 254 W. 4th St., New York, N.Y. 10014

[22] Filed: Sept. 30, 1970

[21] Appl. No.: 76,763

[52] U.S. Cl. ........................................................248/317
[51] Int. Cl. ........................................................F16m 13/00
[58] Field of Search....................248/17, 60, 102, 104, 105, 248/106, 107, 317, 318; 52/39, 484; 49/147; 160/88, 181, 352; 40/128; 240/85 R, 85 E, 86, 88, 78 E

[56] References Cited

UNITED STATES PATENTS 1,187,587  6/1916  White........................................248/60
2,673,705  3/1954  Buckley..................................248/102 X

*Primary Examiner*—William H. Schultz
*Attorney*—Charles E. Baxley, Frank M. Nolan and Thomas E. Tate

[57] ABSTRACT

Disclosed herein is a suspension system, preferably for connection to a ceiling, wherein a plurality of groups of elongated elements are fixed to the ceiling. Each group comprises three of such elongated elements disposed angularly with respect to both horizontal and vertical planes, wherein the three elements are joined together at an apex and extend upwardly from the apex so that their upper ends are disposed in a common horizontal plane. Thus, each group of elements forms a tetrahedron having three open sides defined by planes passing through the elements of the group, and having a fourth side defined by a plane passing through their upper ends.

2 Claims, 4 Drawing Figures

PATENTED JUL 11 1972 3,675,884

INVENTOR.
JOHN M. STORYK
BY Charles E. Baxley
Attorney

SUSPENSION SYSTEM

BACKGROUND OF THE DISCLOSURE

It has been common in the past to provide ceiling suspension systems by merely hanging chains or rigid members vertically from the ceiling for supporting lighting fixtures or partitions for providing enclosures. However, a need has been recognized for such suspension system which, while providing a sound structure for the suspended objects, also provides an esthetically desirable system wherein, for example, the suspension system forms an extension of the enclosures depending therefrom. It is an object of this invention to provide a suspension system which satisfies these requirements.

SUMMARY OF THE INVENTION

In accordance with the invention the suspension system comprises a plurality of groups of elongated elements disposed angularly with respect to both horizontal and vertical planes. Each said group comprises three of such elongated elements, joined together at an apex and extending upwardly therefrom so that the upper ends of the three elements are disposed in a common horizontal plane. The upper ends of the elements are fastened to a ceiling, or some other support means, while at least one of said upper ends may be merely joined with the upper end of another group of elements and freely suspended at such joint.

The apexes of the groups may be provided with additional depending elements, or with extensions of the elements in the said groups, thereby providing convenient members for attaching lighting fixtures and the like, or for attaching panels used to form enclosures below the suspension system. Such panels may be connected to the depending elements, to the apexes, and to the upper ends of the elements, thereby providing a suspension system for a variety of differently shaped enclosures having lines which blend esthetically with the suspension system.

BRIEF DESCRIPTION OF THE DRAWING

The accompanying drawing illustrates a preferred embodiment of the invention. In such drawing.

DETAILED DESCRIPTION OF THE PREFERRED EMBODIMENT

Figure 1:
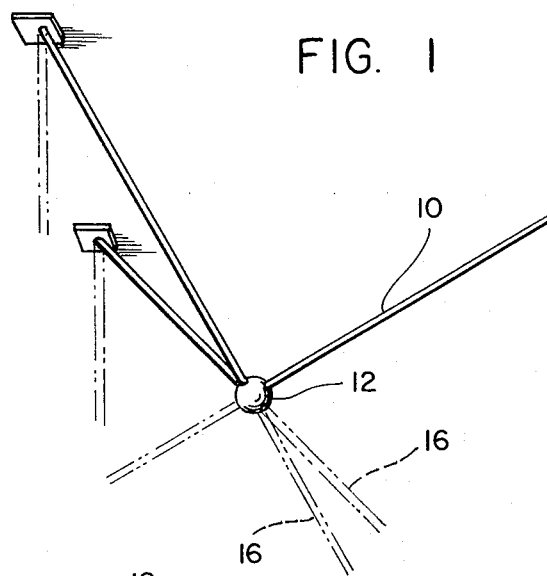
FIG. 1 is a perspective view of a single group of elongated elements embodied in the invention.

The suspension system of the invention comprises a plurality of connected similar units, each unit, as shown in FIG. 1, comprising a group of elongated elements disposed angularly with respect to both horizontal and vertical planes. The elements 10 are joined together at an apex 12 and extend upwardly therefrom for connection to a ceiling surface 14. The elements 10 are of equal length from the apex 12 to the ceiling 14, thereby forming a tetrahedron having three open sides of identical dimensions defined by the elements 10, and having a fourth side defined by the ceiling surface which forms a plane passing through the upper ends of the elements 10.

Depending elements 16 may be connected to the apex 12, and may preferably comprise extensions of the elements 10. Such depending elements 16 provide convenient members for suspending lighting fixtures such, as 20 shown in FIGS. 2 and 3, or panels 24 for forming enclosures, as shown in FIG. 4.

Figure 2:
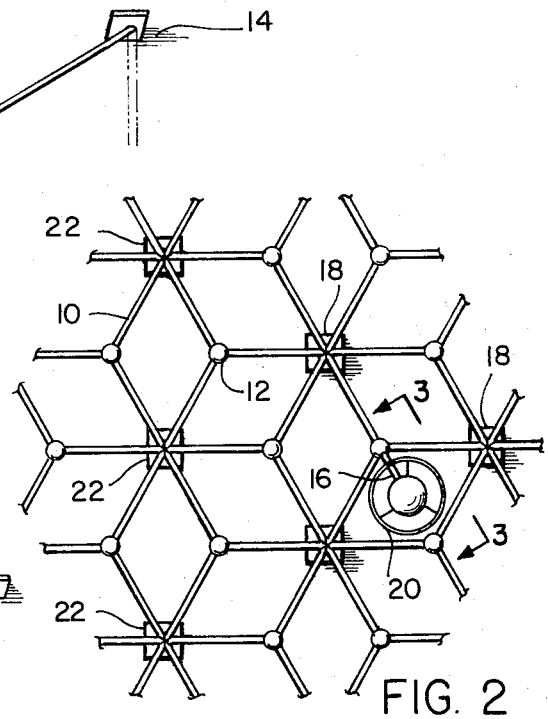
FIG. 2 is a bottom view of a plurality of such groups of elements shown in FIG. 1, said groups being joined together to provide a suspension system.
Figure 3:
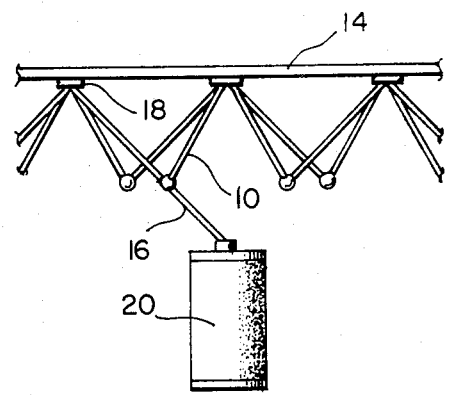
FIG. 3 is a sectional view taken along the line 3—3 of FIG. 2, and shows a lighting fixture attached to the suspension system of FIG. 2.

A suspension system may be provided by combining a plurality of such groups of elements, as shown in FIG. 2, wherein the points of connection of the elements 10 to the ceiling 14 also provide the points of connection for a plurality of other groups of such elements. Thus, a single connection point 18 for the upper end of an element 10 may also provide the connection point for at least five additional groups of elements, whereby the groups are repeated and disposed adjacent each other. Lighting fixtures may be conveniently attached to such extensions 16, as shown in FIGS. 2 and 3, and the elements 10 may be of rigid tubular members, thereby providing conduits for the wiring of such light fixtures. In the case where the elements 10 are rigid members, the connection points of their upper ends, such as indicated by reference numeral 22, may be merely suspended in midair such connection point being cooperatively supported by the various elements 10 connected thereto. Alternatively, the elements 10 may comprise flexible chains or cables, joined together as described above to provide the suspension system.

Figure 4:
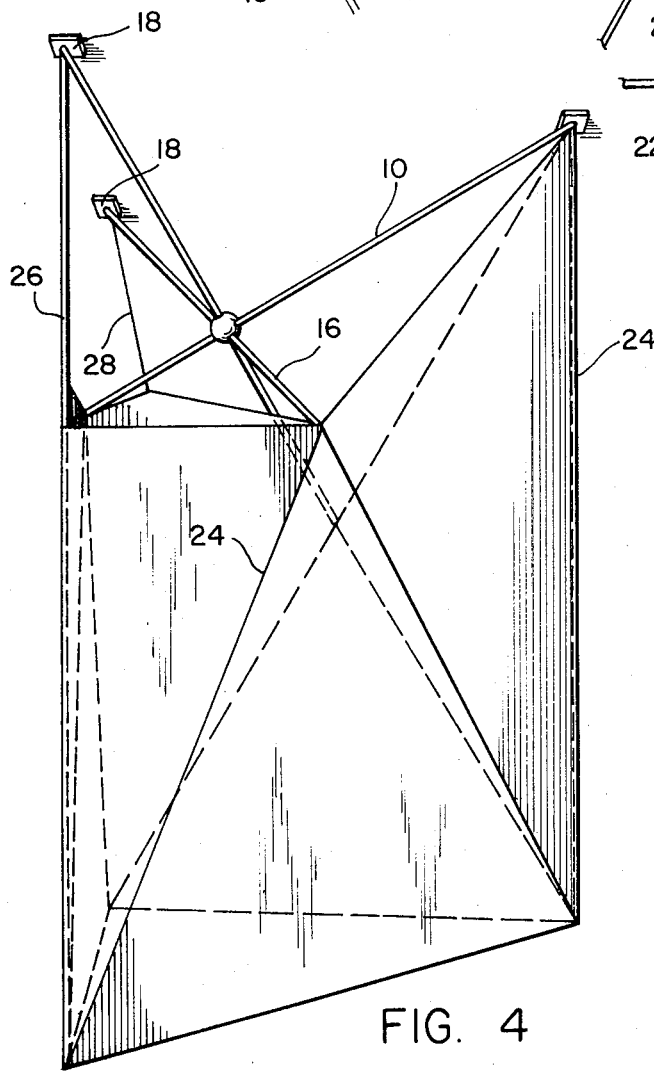
FIG. 4 is a perspective view of an enclosure formed by panels connected to the suspension system of the invention.

Panels 24 may be hung from one or more of the units of the suspension system, as shown in FIG. 4, such panels comprising sheets of fabric, thereby providing tentlike enclosures. As shown, the panels 24 may be connected to the connection points 18 of the upper ends of the elements 10; to the extending elements 16; and, they may be connected indirectly to the ceiling connection points 18 by rigid members 26 or by cables 28.

It is understood of course that other articles may be supported by the suspension system, whereby their support will be structurally sound and esthetically desirable.

I claim:

1. A system of overhead, suspended, supporting members including a plurality of groups of elongated elements disposed angularly with respect to both horizontal and vertical planes, each said group comprising three said elements joined together at an apex, said three elements extending angularly upward from said apex and having their upper ends disposed in a common horizontal plane, and means for suspending said upper ends of said three elements in said common plane, the system further comprising a fourth said elongated element connected to said apex of one of said groups and extending downward, and means connected to said fourth element for suspension therefrom.

2. A system of overhead, suspended, supporting members as set forth in claim 1, in which said fourth element comprises an extension of one of said three elements in one of said groups, said extension projecting downwardly from said apex.

* * * * *